United States Patent
Jiang et al.

(10) Patent No.: US 12,542,438 B2
(45) Date of Patent: Feb. 3, 2026

(54) INTEGRATED PCBA DESIGN WITH FAST CONNECTION-DISCONNECTION CAPABILITIES FOR CELL TO SYSTEM DESIGN

(71) Applicant: Enphase Energy, Inc., Petaluma, CA (US)

(72) Inventors: Wei Jiang, Round Rock, TX (US); Chien-Fan Chen, Fremont, CA (US); Christopher McNair Lyke, Austin, TX (US); Chris Morrow Young, Round Rock, TX (US)

(73) Assignee: Enphase Energy, Inc., Petaluma, CA (US)

( * ) Notice: Subject to any disclaimer, the term of this patent is extended or adjusted under 35 U.S.C. 154(b) by 929 days.

(21) Appl. No.: 17/716,059

(22) Filed: Apr. 8, 2022

(65) Prior Publication Data
US 2023/0327446 A1  Oct. 12, 2023

(51) Int. Cl.
*H02J 3/28* (2006.01)
*H01M 10/42* (2006.01)
*H01M 50/531* (2021.01)
*H02J 3/38* (2006.01)

(52) U.S. Cl.
CPC ........... *H02J 3/28* (2013.01); *H01M 10/4207* (2013.01); *H01M 10/4257* (2013.01); *H01M 50/531* (2021.01); *H02J 3/381* (2013.01); *H01M 2010/4271* (2013.01); *H02J 2300/20* (2020.01)

(58) Field of Classification Search
USPC ........ 320/134, 135, 136, 137, 138, 139, 140
See application file for complete search history.

(56) References Cited

U.S. PATENT DOCUMENTS

| | | | |
|---|---|---|---|
| 2006/0139859 A1* | 6/2006 | Wong | G06F 1/1632 361/679.08 |
| 2013/0164567 A1* | 6/2013 | Olsson | H01M 10/425 429/93 |
| 2017/0104350 A1 | 4/2017 | Luerkens et al. | |
| 2018/0198178 A1 | 7/2018 | Deokar et al. | |
| 2019/0109307 A1 | 4/2019 | Jiang et al. | |
| 2020/0321664 A1 | 10/2020 | Chang et al. | |
| 2021/0151840 A1 | 5/2021 | Shayan et al. | |
| 2021/0225159 A1* | 7/2021 | Grobelny | G08B 29/16 |
| 2021/0336302 A1* | 10/2021 | Statman | H01M 10/425 |
| 2022/0264513 A1* | 8/2022 | DeGiovine | H04W 64/00 |

OTHER PUBLICATIONS

PCT International Search Report and Written Opinion for Application No. PCT/US2023/014882 dated Jun. 23, 2023, 8 pgs.

* cited by examiner

*Primary Examiner* — Brian Ngo
(74) *Attorney, Agent, or Firm* — Moser Taboada (57) ABSTRACT

The present disclosure provides an energy storage system. For example, an energy storage system comprises a chassis and a printed circuit board assembly connected to the chassis and comprising a connecting/disconnecting device configured to connect to a corresponding connecting/disconnecting device on the battery cell for enabling connection of the battery cell to the chassis.

20 Claims, 5 Drawing Sheets

INTEGRATED PCBA DESIGN WITH FAST CONNECTION-DISCONNECTION CAPABILITIES FOR CELL TO SYSTEM DESIGN

BACKGROUND

Field of the Disclosure

Embodiments of the present disclosure relate generally to energy storage systems, and, for example, to integrated printed circuit board assemblies (PCBAs) with fast connection-disconnection capabilities to a battery cell of a distributed energy resource.

Description of the Related Art

Conventional lithium ion (Li-ion) battery modules/packs can be configured for use with distributed energy resources and can be quite expensive. For example, Table 1 shows estimated lithium iron phosphate (LFP) battery pack costs. LFP is one type of Li-ion battery.

TABLE 1

| CATEGORY | PACK COST USD/kWh | % |
|---|---|---|
| Cell | 115.40 | 72.8 |
| Pack Components | 27.03 | 17.1 |
| Labor | 4.62 | 2.9 |
| Manufacturing | 0.27 | 0.2 |
| Equipment Depreciation | 0.71 | 0.4 |
| Plant Depreciation | 0.45 | 0.3 |
| Markup | 10.00 | 6.3 |

Based on the above table, while the LFP battery pack component is not a major contributor, at 17.1%, of overall LFP battery pack cost, the LFP battery pack component cost is still quite high when compared to the other categories listed in Table 1. A reason for the relatively high cost associated with the LFP battery pack component is the need of a manufacture to assemble battery cells of the LFP battery pack component to a module and then installing the module to an energy storage system.

Accordingly, there is a need for PCBAs with fast connection-disconnection capabilities to a battery cell, which allows the battery cell to be directly connected to a chassis (of an energy storage system) in which the PCBA can be connected to.

SUMMARY

Energy storage systems are provided herein. For example, in some embodiments, an energy storage system comprises a chassis and a printed circuit board assembly connected to the chassis and comprising a connecting/disconnecting device configured to connect to a corresponding connecting/disconnecting device on a battery cell for enabling connection of the battery cell to the chassis.

In accordance with some aspects of the disclosure, an energy management system comprises a distributed energy resource comprising a renewable energy source, a load center connected to the renewable energy source, and an energy storage system comprises a battery cell, a chassis, and a printed circuit board assembly (which can be connected to the chassis) comprising a connecting/disconnecting device configured to connect to a corresponding connecting/disconnecting device on the battery cell for enabling connection of the battery cell to the chassis.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments of the present disclosure relate to integrated printed circuit board assemblies (PCBAs) with fast connection-disconnection capabilities to a battery cell of a distributed energy resource. For example, the PCBAs described herein can be configured for use with an energy storage system that comprises a chassis. For example, in at least some embodiments, the PCBAs can be connected to or embedded in the chassis of an energy storage system and can comprise a connecting/disconnecting device configured to connect to a corresponding connecting/disconnecting device on a battery cell for enabling connection of the battery cell to the chassis. The PCBAs described herein are relatively inexpensive to manufacture, can reduce cost associated of battery cell manufacture, and can enable quick field replacement of the battery cells (e.g., quick connect/disconnect to/from corresponding battery cells).

Figure 1:
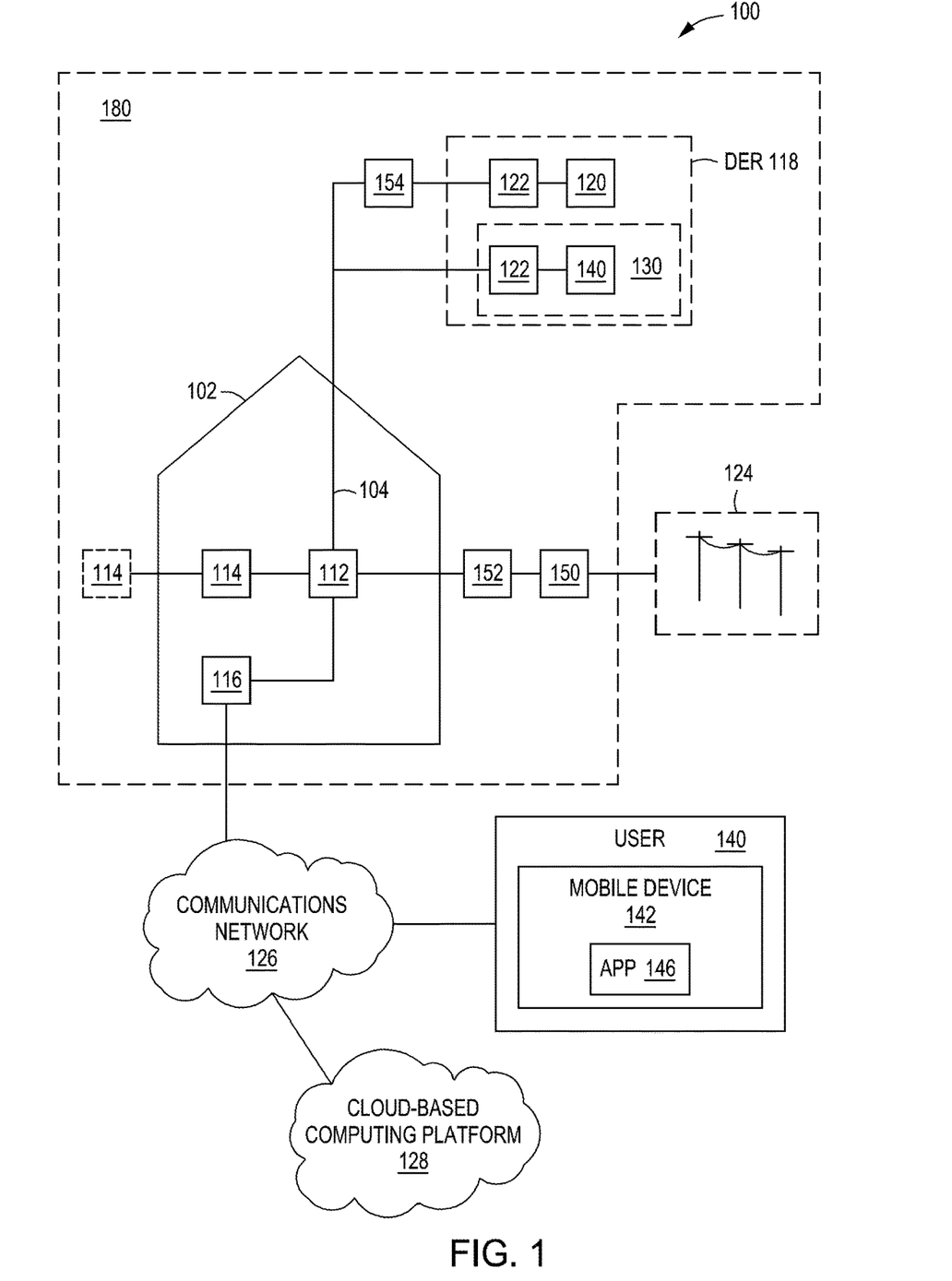
FIG. 1 is a block diagram of an energy management system, in accordance with one or more embodiments of the present disclosure.

FIG. 1 is a block diagram of a system 100 (e.g., an energy management system or power conversion system) in accordance with one or more embodiments of the present disclosure. The diagram of FIG. 1 only portrays one variation of the myriad of possible system configurations. The present disclosure can function in a variety of environments and systems.

The system 100 comprises a structure 102 (e.g., a user's structure), such as a residential home or commercial building, having an associated DER 118 (distributed energy resource). The DER 118 is situated external to the structure 102. For example, the DER 118 may be located on the roof of the structure 102 or can be part of a solar farm. The structure 102 comprises one or more loads (e.g., appliances, electric hot water heaters, thermostats/detectors, boilers, water pumps, and the like), one or more energy storage devices (an energy storage system 114), which can be located within or outside the structure 102, and a DER controller 116, each coupled to a load center 112. Although the energy storage system 114, the DER controller 116, and the load center 112 are depicted as being located within the structure 102, one or more of these may be located external to the structure 102. In at least some embodiments, the energy storage system 114 can be, for example, one or more of the energy storage devices (e.g., IQ Battery 10®) commercially available from Enphase® Inc. of Petaluma, CA. Other energy storage devices from Enphase® Inc. or other manufacturers may also benefit from the inventive methods and apparatus disclosed herein.

The load center 112 is coupled to the DER 118 by an AC bus 104 and is further coupled, via a meter 152 and a MID 150 (e.g., microgrid interconnect device), to a grid 124 (e.g., a commercial/utility power grid). The structure 102, the energy storage system 114, DER controller 116, DER 118, load center 112, generation meter 154, meter 152, and MID 150 are part of a microgrid 180. It should be noted that one or more additional devices not shown in FIG. 1 may be part of the microgrid 180. For example, a power meter or similar device may be coupled to the load center 112.

The DER 118 comprises at least one renewable energy source (RES) coupled to power conditioners 122. For example, the DER 118 may comprise a plurality of RESs 120 coupled to a plurality of power conditioners 122 in a one-to-one correspondence (or two-to-one). In embodiments described herein, each RES of the plurality of RESs 120 is a photovoltaic module (PV module), although in other embodiments the plurality of RESs 120 may be any type of system for generating DC power from a renewable form of energy, such as wind, hydro, and the like. The DER 118 may further comprise one or more batteries (or other types of energy storage/delivery devices) coupled to the power conditioners 122 in a one-to-one correspondence, where each pair of power conditioner 122 and a battery 141 may be referred to as an AC battery 130.

The power conditioners 122 invert the generated DC power from the plurality of RESs 120 and/or the battery 141 to AC power that is grid-compliant and couple the generated AC power to the grid 124 via the load center 112. The generated AC power may be additionally or alternatively coupled via the load center 112 to the one or more loads and/or the energy storage system 114. In addition, the power conditioners 122 that are coupled to the batteries 141 convert AC power from the AC bus 104 to DC power for charging the batteries 141. A generation meter 154 is coupled at the output of the power conditioners 122 that are coupled to the plurality of RESs 120 in order to measure generated power.

In some alternative embodiments, the power conditioners 122 may be AC-AC converters that receive AC input and convert one type of AC power to another type of AC power. In other alternative embodiments, the power conditioners 122 may be DC-DC converters that convert one type of DC power to another type of DC power. In some of embodiments, the DC-DC converters may be coupled to a main DC-AC inverter for inverting the generated DC output to an AC output.

The power conditioners 122 may communicate with one another and with the DER controller 116 using power line communication (PLC), although additionally and/or alternatively other types of wired and/or wireless communication may be used. The DER controller 116 may provide operative control of the DER 118 and/or receive data or information from the DER 118. For example, the DER controller 116 may be a gateway that receives data (e.g., alarms, messages, operating data, performance data, and the like) from the power conditioners 122 and communicates the data and/or other information via the communications network 126 to a cloud-based computing platform 128, which can be configured to execute one or more application software, e.g., a grid connectivity control application, to a remote device or system such as a master controller (not shown), and the like. The DER controller 116 may also send control signals to the power conditioners 122, such as control signals generated by the DER controller 116 or received from a remote device or the cloud-based computing platform 128. The DER controller 116 may be communicably coupled to the communications network 126 via wired and/or wireless techniques. For example, the DER controller 116 may be wirelessly coupled to the communications network 126 via a commercially available router. In one or more embodiments, the DER controller 116 comprises an application-specific integrated circuit (ASIC) or microprocessor along with suitable software (e.g., a grid connectivity control application) for performing one or more of the functions described herein. For example, the DER controller 116 can include a memory (e.g., a non-transitory computer readable storage medium) having stored thereon instructions that when executed by a processor perform a method for grid connectivity control, as described in greater detail below.

The generation meter 154 (which may also be referred to as a production meter) may be any suitable energy meter that measures the energy generated by the DER 118 (e.g., by the power conditioners 122 coupled to the plurality of RESs 120). The generation meter 154 measures real power flow (kWh) and, in some embodiments, reactive power flow (kVAR). The generation meter 154 may communicate the measured values to the DER controller 116, for example using PLC, other types of wired communications, or wireless communication. Additionally, battery charge/discharge values are received through other networking protocols from the AC battery 130 itself.

The meter 152 may be any suitable energy meter that measures the energy consumed by the microgrid 180, such as a net-metering meter, a bi-directional meter that measures energy imported from the grid 124 and well as energy exported to the grid 124, a dual meter comprising two separate meters for measuring energy ingress and egress, and the like. In some embodiments, the meter 152 comprises the MID 150 or a portion thereof. The meter 152 measures one or more of real power flow (kWh), reactive power flow (kVAR), grid frequency, and grid voltage.

The MID 150, which may also be referred to as an island interconnect device (IID), connects/disconnects the microgrid 180 to/from the grid 124. The MID 150 comprises a disconnect component (e.g., a contactor or the like) for physically connecting/disconnecting the microgrid 180 to/from the grid 124. For example, the DER controller 116 receives information regarding the present state of the system from the power conditioners 122, and also receives the energy consumption values of the microgrid 180 from the meter 152 (for example via one or more of PLC, other types of wired communication, and wireless communication), and based on the received information (inputs), the DER controller 116 determines when to go on-grid or off-grid and instructs the MID 150 accordingly. In some alternative embodiments, the MID 150 comprises an ASIC or CPU, along with suitable software (e.g., an islanding module) for determining when to disconnect from/connect to the grid 124. For example, the MID 150 may monitor the grid 124 and detect a grid fluctuation, disturbance or outage and, as a result, disconnect the microgrid 180 from the grid 124. Once disconnected from the grid 124, the microgrid 180 can continue to generate power as an intentional island without imposing safety risks, for example on any line workers that may be working on the grid 124.

In some alternative embodiments, the MID 150 or a portion of the MID 150 is part of the DER controller 116. For example, the DER controller 116 may comprise a CPU and an islanding module for monitoring the grid 124, detecting grid failures and disturbances, determining when to disconnect from/connect to the grid 124, and driving a disconnect component accordingly, where the disconnect component may be part of the DER controller 116 or, alternatively, separate from the DER controller 116. In some embodiments, the MID 150 may communicate with the DER controller 116 (e.g., using wired techniques such as power line communications, or using wireless communication) for coordinating connection/disconnection to the grid 124.

A user 140 can use one or more computing devices, such as a mobile device 142 (e.g., a smart phone, tablet, or the like) communicably coupled by wireless means to the communications network 126. The mobile device 142 has a CPU, support circuits, and memory, and has one or more applications 146 (e.g., a grid connectivity control application) installed thereon for controlling the connectivity with the grid 124 as described herein. The one or more applications 146 may run on commercially available operating systems, such as 10S, ANDROID, and the like.

In order to control connectivity with the grid 124, the user 140 interacts with an icon displayed on the mobile device 142, for example a grid on-off toggle control or slide, which is referred to herein as a toggle button. The toggle button may be presented on one or more status screens pertaining to the microgrid 180, such as a live status screen (not shown), for various validations, checks and alerts. The first time the user 140 interacts with the toggle button, the user 140 is taken to a consent page, such as a grid connectivity consent page, under setting and will be allowed to interact with toggle button only after he/she gives consent.

Once consent is received, the scenarios below, listed in order of priority, will be handled differently. Based on the desired action as entered by the user 140, the corresponding instructions are communicated to the DER controller 116 via the communications network 126 using any suitable protocol, such as HTTP(S), MQTT(S), WebSockets, and the like. The DER controller 116, which may store the received instructions as needed, instructs the MID 150 to connect to or disconnect from the grid 124 as appropriate.

Figure 2:
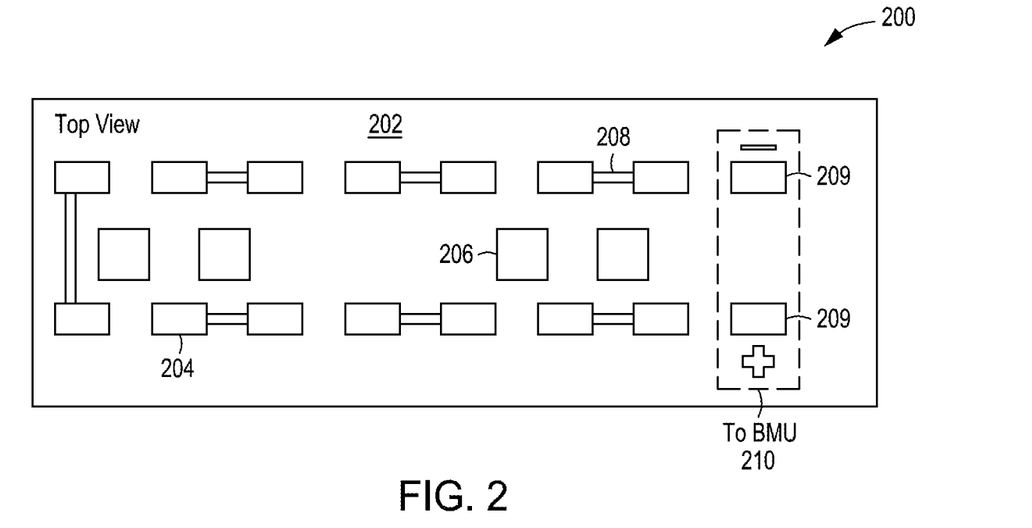
FIG. 2 is a diagram of an integrated PCBA configured for use with the energy management system of FIG. 1, in accordance with one or more embodiments of the present disclosure.

FIG. 2 is a diagram of an integrated PCBA 200 configured for use with the system 100 of FIG. 1, in accordance with one or more embodiments of the present disclosure. For example, the PCBA 200 can be configured for use with one or more energy storage devices (e.g., the energy storage system 114), such as the storage system disclosed in commonly-owned U.S. patent application Ser. No. 17/145,793, filed Jan. 11, 2021 and entitled "Storage System Configured For Use With An Energy Management System," the entire contents of which is incorporated herein by reference.

The PCBA 200 comprises a base 202, one or more connectors 204 (e.g., one or more connecting/disconnecting device), one or more signal processing components 206, one or more electrical traces 208, and one or more connection modules 210.

The base 202 can be made of one or more suitable materials typically used for PCBA fabrication. Disposed along a top surface of the base 202 are one or more connectors 204 configured to connect to one or more battery cells. For example, the one or more connectors 204 can be configured to connect to cylindrical battery cells, prismatic battery cells, or pouch battery cells. In at least some embodiments, the one or more connectors 204 can be configured to connect to cylindrical battery cells or prismatic battery cells. The one or more connectors 204 can comprise at least one of a spring, a terminal connector, a clamp, welding, connective glue, or a bolt. For example, in at least some embodiments, the one or more connectors 204 can comprise a plurality of terminal connectors, which can be configured to connect to a corresponding tab or wire connector of a battery cell, as described in greater detail below.

The one or more signal processing components 206 (four signal processing components shown) can be built into (embedded) the base 202 and can comprise sensing components/circuits that can operably communicate (via a wired or wireless configuration) with one or more components of the system 100 (e.g., the DER controller 116, the load center 112, etc.). For example, the one or more signal processing components 206 can be configured to transmit/receive battery cell data to/from the DER controller 116, the load center 112, and/or a battery management unit (BMU) of the energy storage system 114. The battery cell data can comprise, for example, battery connection data (e.g., whether the PCBA 200 is connected to the battery cells), battery status data (e.g., charge of battery), etc.

The one or more electrical traces 208 can be formed from one or more suitable conductive materials (e.g., copper, silver, gold, etc.) and are configured to electrically connect the one or more connectors 204 and/or the one or more signal processing components 206 to each other. The one or more electrical traces 208 can be disposed on a top surface of the base 302 of the PCBA 200 (as shown in FIG. 2), or the one or more traces can be embedded in the base 202.

The one or more connection modules 210 are configured to connect to a BMU (not shown). For example, in at least some embodiments, two of the one or more connectors 209 are dedicated for connection to a BMU. In at least some embodiments, the connectors dedicated for connection to a BMU can correspond to a positive terminal and a negative terminal.

Figure 3:
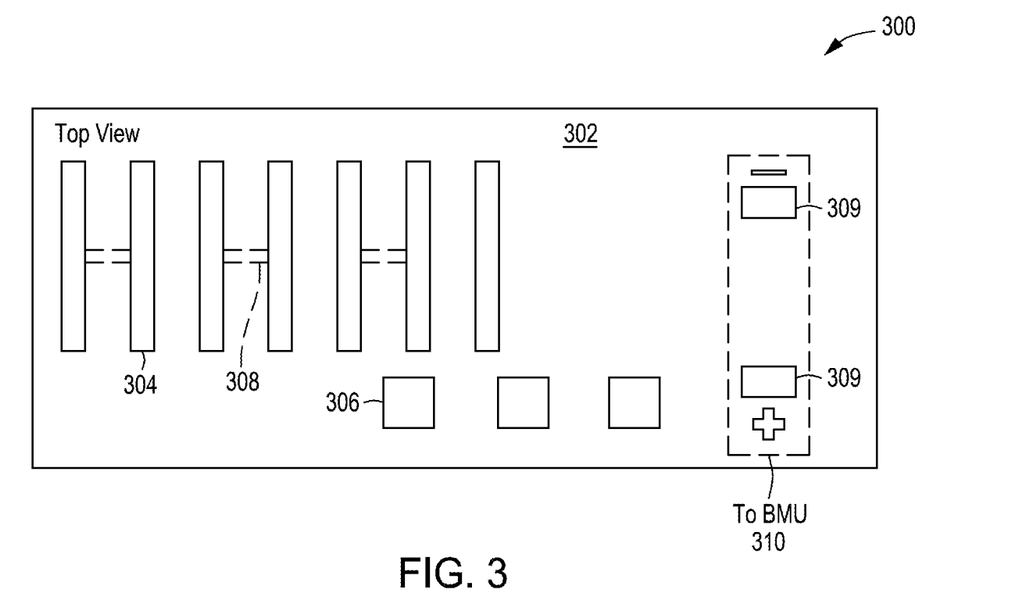
FIG. 3 is a diagram of an integrated PCBA configured for use with the energy management system of FIG. 1, in accordance with one or more embodiments of the present disclosure.

FIG. 3 is a diagram of an integrated PCBA 300 configured for use with the system of FIG. 1, in accordance with one or more embodiments of the present disclosure. The PCBA 300 comprises a base 302, one or more connectors 304 (e.g., one or more connecting/disconnecting device), one or more signal processing components 306, one or more traces 308, and one or more connection modules 310, which (other than a location on the base 302) all function as described above with respect to the corresponding components of FIG. 2. Unlike the PCBA 200, the PCBA 300, however, is configured to connect to one or more pouch battery cells, and, as such, the PCBA 300 is specially designed for pouch cells with tabs and comprises multiple connectors 304 that are part of the connection module 310. Additionally, the one or more electrical traces 208 can be disposed on a top surface of the base 302 or the one or more traces can be embedded (shown in phantom) in the base 302 of the PCBA 300 (as shown in FIG. 3).

Figure 4:
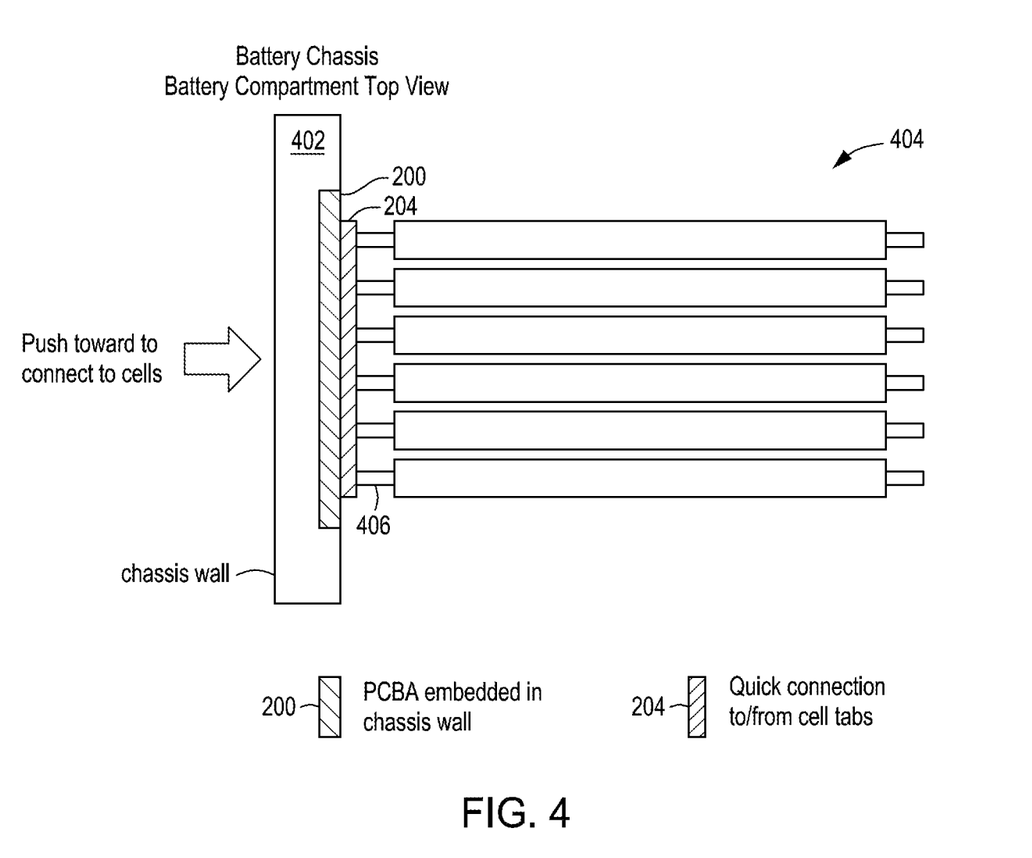
FIG. 4 is a top view of an integrated PCBA connected to a battery chassis configured for use with the energy management system of FIG. 1, in accordance with one or more embodiments of the present disclosure.

FIG. 4 is a top view of an integrated PCBA connected to a battery chassis configured for use with the energy management system of FIG. 1, in accordance with one or more embodiments of the present disclosure. For illustrative purposes, the PCBA 200 is shown connected to a battery chassis in FIG. 4. In use, the PCBA 200 is embedded in a chassis wall 402 of a chassis 400 of the energy storage system 114. Alternatively, the PCBA 200 can be connected to the chassis wall 402 using one or more connection devices (e.g., screws, bolts, adhesives, etc.). The PCBA 200 enables quick connection/disconnection of a of one or more battery cells 404 to the chassis wall 402. For example, the one or more battery cells 404 (a plurality of battery cells shown) comprise one or more connectors that are configured to connect/disconnect to a corresponding one of the one or more connectors 204 on the PCBA 200. In at least some embodiments, the one or more connectors on each of the one or more battery cells 404 can comprise a corresponding one of the tabs 406 that is configured to connect to a corresponding one of the one or more connectors 204 (e.g., a terminal) on the PCBA 200 (e.g., when pushed into the connectors 204, or vice versa).

Figure 5:
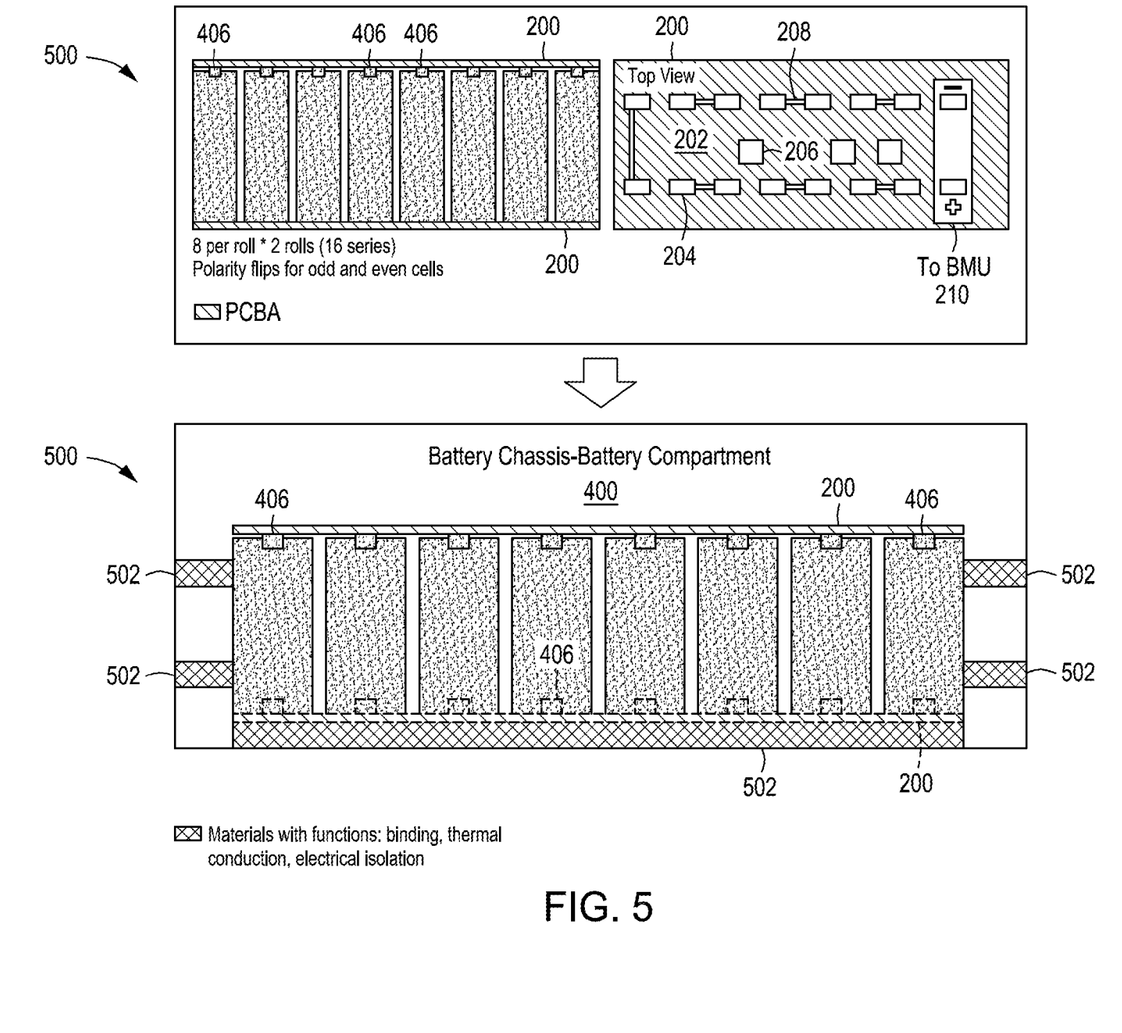
FIG. 5 is a diagram of an integrated PCBA configured for use with cylindrical cells and prismatic cells, in accordance with one or more embodiments of the present disclosure.

FIG. 5 is a diagram of an integrated PCBA configured for use with cylindrical cells or prismatic cells, in accordance with one or more embodiments of the present disclosure. For example, battery cells 500 comprise eight battery cells (e.g., eight per row) times two rows for a total of 16 series connected battery cells, with a polarity alternating for odd and even numbered cells.

In embodiments where battery cells have tabs on the same side (e.g., a top tab and a bottom tab), a single PCBA 200 is all that is needed to connect the battery cell to a chassis. For example, battery cells with a top tab and a bottom tab can connect/disconnect to corresponding top and bottom terminals on the PCBA 200. Alternatively, where the battery cells have two-sided tabs (e.g., at least one of a top tab and a bottom tab on opposite sides of the battery cell), two PCBAs 200 are needed to connect the battery cell to a chassis. The additional PCBA 200 is shown in phantom.

In at least some embodiments, one or more materials 502 with functionality can be provided on the PCBA 200. For example, binding materials, thermal conduction materials, electrical isolation materials, etc. can be provided on/between or connected to the PCBA 200, the chassis, and/or the battery cells.

Figure 6:
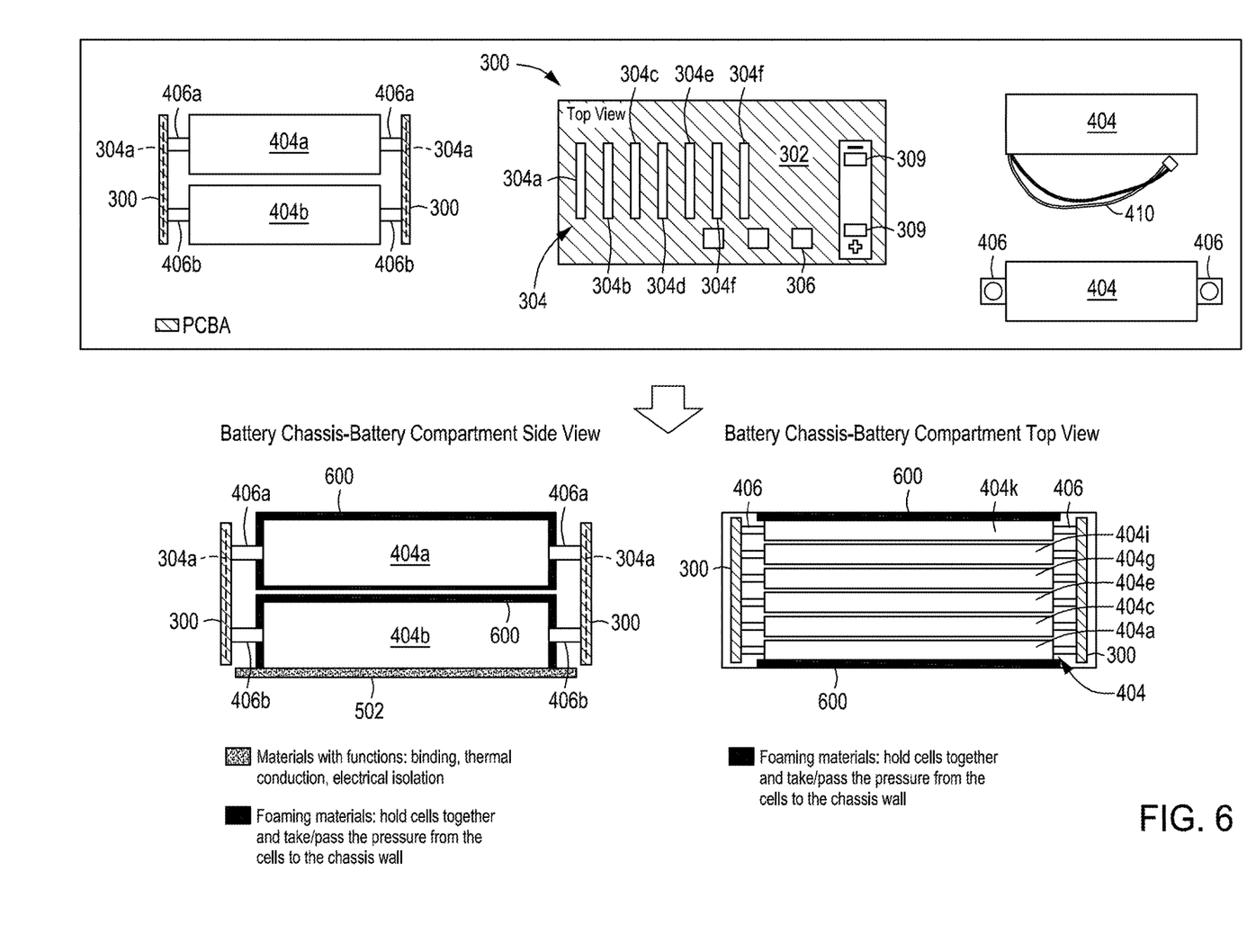
FIG. 6 is a diagram of an integrated PCBA configured for use with and pouch cells, in accordance with one or more embodiments of the present disclosure.

FIG. 6 is a diagram of an integrated PCBA configured for use with pouch cells, in accordance with one or more embodiments of the present disclosure. For example, in at least some embodiments, the PCBA 300 can comprise a connector 304 and a connector, 304b (in the connection module 310) that can be configured to connect to a corresponding wired connector 410 and/or a tab 406 of the battery cells 404. For illustrative purposes, the PCBA 300 is shown connected to the battery cells 404 that comprise the tabs 406.

As illustrated in FIG. 6, two battery cells 404 (a top battery cell 404a and bottom battery cell 404b) comprise tabs 406a and tabs 406b (i.e., a two-sided battery cell) that are configured to connect to a connector 304a (e.g., a top connector) and a connector 304b (e.g., a bottom connector), respectively, of the PCBA 300. In at least some embodiments, foaming material 600 may be provided on/between the battery cells 404 to hold the battery cells 404 in place/together and remove some of the pressure from the battery cells 404, the tabs 406, and/or the connectors 304 (e.g., redirect the pressure to the chassis wall).

While the foregoing is directed to embodiments of the present disclosure, other and further embodiments of the disclosure may be devised without departing from the basic scope thereof, and the scope thereof is determined by the claims that follow.

What is claimed is:

1. An energy storage system configured as a renewable energy source and for use with an energy management system, comprising:
   a chassis; and
   a printed circuit board assembly connected to the chassis and comprising connecting/disconnecting devices configured to connect to corresponding connecting/disconnecting devices on a battery cell for enabling connection of the battery cell to the chassis,
   wherein the connecting/disconnecting devices of the printed circuit board assembly are at least on one of a same side or an opposite side of the printed circuit board assembly,
   wherein the connecting/disconnecting devices of the battery cell are at least on one of a same side or an opposite side of the battery cell, and
   wherein the energy storage system is configured to form a microgrid along with components of the energy management system.

2. The energy storage system of claim 1, wherein the connecting/disconnecting device of the printed circuit board assembly comprises at least one of a spring, a terminal connector, a clamp, welding, connective glue, or a bolt.

3. The energy storage system of claim 1, wherein the battery cell is one of a cylindrical battery cell, a prismatic battery cell, or a pouch battery cell.

4. The energy storage system of claim 1, wherein the printed circuit board assembly further comprises at least one of signal processing components, electrical traces, or a connection module that connects to a battery management unit.

5. The energy storage system of claim 4, wherein the signal processing components are configured to transmit/receive battery cell data to/from at least one of a DER controller, a load center, or the battery management unit of the energy storage system.

6. The energy storage system of claim 5, wherein the battery cell data comprises at least one of battery connection data or battery status data.

7. The energy storage system of claim 1, wherein the printed circuit board assembly is one of embedded in the chassis or connected to the chassis using at least one of nuts, bolts, screws, or adhesives.

8. An energy management system, comprising:
   a distributed energy resource comprising a renewable energy source;
   a load center connected to the renewable energy source; and
   an energy storage system configured as the renewable energy source and to form a microgrid along with components of the energy management system, comprising:
      a battery cell;
      a chassis; and
      a printed circuit board assembly is connected to the chassis and comprises connecting/disconnecting devices configured to connect to corresponding connecting/disconnecting devices on the battery cell for enabling connection of the battery cell to the chassis, wherein the connecting/disconnecting devices of the printed circuit board assembly are at least on one of a same side or an opposite side of the printed circuit board assembly, and wherein the connecting/disconnecting devices of the battery cell are at least on one of a same side or an opposite side of the battery cell.

9. The energy management system of claim 8, wherein the connecting/disconnecting device of the printed circuit board assembly comprises at least one of a spring, a terminal connector, a clamp, welding, connective glue, or a bolt.

10. The energy management system of claim 8, wherein the battery cell is one of a cylindrical battery cell, a prismatic battery cell, or a pouch battery cell.

11. The energy management system of claim 8, wherein the printed circuit board assembly further comprises at least one of signal processing components, electrical traces, or a connection module that connects to a battery management unit.

12. The energy management system of claim 11, wherein the signal processing components are configured to transmit/receive battery cell data to/from at least one of a DER controller, a load center, or the battery management unit of the energy storage system.

13. The energy management system of claim 12, wherein the battery cell data comprises at least one of battery connection data or battery status data.

14. The energy management system of claim 8, wherein the printed circuit board assembly is one of embedded in the chassis or connected to the chassis using at least one of nuts, bolts, screws, or adhesives.

15. The energy management system of claim 8, further comprising at least one of binding materials, thermal conduction materials, electrical isolation materials that are at least one of provided on, between, or connected to one of the printed circuit board assembly, the chassis, or the battery cell.

16. The energy management system of claim 8, further comprising foaming material provided on the battery cell to hold the battery cell in place and remove pressure from the battery cell, the connecting/disconnecting device of the printed circuit board assembly, or the connecting/disconnecting device of the battery cell and redirect the pressure to the chassis.

17. The energy management system of claim 8, wherein the connecting/disconnecting device of the battery cell comprises at least one of tab or a wired connector.

18. The energy management system of claim 8, further comprising a plurality of battery cells comprising a plurality of connecting/disconnecting devices, and wherein the printed circuit board assembly comprises a corresponding plurality of connecting/disconnecting devices.

19. The energy management system of claim 18, wherein each battery cell of the plurality of battery cells comprises a connecting/disconnecting device on a same side.

20. The energy management system of claim 18, wherein each battery cell of the plurality of battery cells comprises a connecting/disconnecting device on an opposite side.

* * * * *